(12) United States Patent
Bravo et al.

(10) Patent No.: US 12,277,215 B2
(45) Date of Patent: Apr. 15, 2025

(54) DYNAMIC CREATION OF TEMPORARY ISOLATED ENVIRONMENT IN AN INTERACTIVE COMMUNICATION ENVIRONMENT

(71) Applicant: Kyndryl, Inc., New York, NY (US)

(72) Inventors: Cesar Bravo, Alajuela (CR); Christopher Collins Bode, Holly Springs, NC (US)

(73) Assignee: Kyndryl, Inc., New York, NY (US)

( * ) Notice: Subject to any disclaimer, the term of this patent is extended or adjusted under 35 U.S.C. 154(b) by 211 days.

(21) Appl. No.: 18/330,620

(22) Filed: Jun. 7, 2023

(65) Prior Publication Data

US 2024/0411860 A1 Dec. 12, 2024

(51) Int. Cl.
*H04L 29/06* (2006.01)
*G06F 21/53* (2013.01)
*H04L 9/40* (2022.01)

(52) U.S. Cl.
CPC .......... *G06F 21/53* (2013.01); *H04L 63/0884* (2013.01); *H04L 63/102* (2013.01); *G06F 2221/034* (2013.01)

(58) Field of Classification Search
CPC ............... G06F 21/53; G06F 2221/034; H04L 63/0884; H04L 63/102
See application file for complete search history.

(56) References Cited

U.S. PATENT DOCUMENTS

| | | |
|---|---|---|
| 11,386,349 B1 | 7/2022 | Prisadnikov et al. |
| 11,533,619 B1 | 12/2022 | Kahn |
| 2015/0005071 A1 | 1/2015 | Yockey |
| 2018/0083894 A1 | 3/2018 | Fung et al. |
| 2019/0138914 A1 | 5/2019 | Meadows |
| 2019/0245812 A1 | 8/2019 | Rico |
| 2019/0364057 A1 | 11/2019 | Hazay et al. |
| 2020/0267165 A1 | 8/2020 | Leliwa et al. |

(Continued)

FOREIGN PATENT DOCUMENTS

| | | | | |
|---|---|---|---|---|
| CA | 3104119 C | * | 8/2023 | ......... G06F 21/6245 |
| CN | 115618314 A | | 1/2023 | |
| EP | 3474159 A1 | | 4/2019 | |

OTHER PUBLICATIONS

Bravo, et al. "Advanced Deterrence for Bots in an Interactive Communication Environment," U.S. Appl. No. 18/330,627, filed Jul. 7, 2023.

(Continued)

*Primary Examiner* — Shawnchoy Rahman
(74) *Attorney, Agent, or Firm* — CANTOR COLBURN LLP; Erik Swanson

(57) ABSTRACT

Embodiments relate to dynamic creating a temporary isolated environment in an interactive communication environment for potential bots. In response to identifying that an avatar accessing the interactive communication environment is being controlled by a non-human entity, the avatar is dynamically placed in an isolated virtual environment. Permission of the avatar are disabled in the isolated virtual environment. An authentication inquiry is presented to the avatar identified as being controlled by the non-human entity. A location is transferred for the avatar identified as being controlled by the non-human entity, based on a user response to the authentication inquiry.

20 Claims, 11 Drawing Sheets

(56) References Cited

U.S. PATENT DOCUMENTS

| | | | |
|---|---|---|---|
| 2020/0278842 A1 | 9/2020 | Shihab et al. | |
| 2020/0336496 A1 | 10/2020 | Modalavalasa et al. | |
| 2020/0366671 A1 | 11/2020 | Larson et al. | |
| 2022/0164643 A1 | 5/2022 | Charnock et al. | |
| 2022/0200978 A1 | 6/2022 | Ho | |
| 2022/0207134 A1* | 6/2022 | Protasov | G06F 8/61 |
| 2022/0210033 A1* | 6/2022 | Higgins | H04L 41/5093 |
| 2023/0004676 A1 | 1/2023 | Falchuk et al. | |
| 2023/0078448 A1 | 3/2023 | Cella et al. | |
| 2024/0135136 A1* | 4/2024 | Munoz | G06N 3/006 |
| 2024/0259201 A1* | 8/2024 | Enciso | H04L 63/0428 |

OTHER PUBLICATIONS

Kyndryl: List of Kyndryl Patents or Patent Applications Treated as Related (Appendix P); Date Filed: Jun. 7, 2023; 2 pages.

Salim, "Dubai Metaverse Assembly Announced for September; To Showcase 'Real' Meetings in Virtual World," Khaleej Times, 2022, 3 pages.

Shepherd, "20 Essential Meta Statistics You Need to Know in 2023," Social Shepherd, Feb. 23, 2023, 12 pages.

\* cited by examiner

DYNAMIC CREATION OF TEMPORARY ISOLATED ENVIRONMENT IN AN INTERACTIVE COMMUNICATION ENVIRONMENT

BACKGROUND

The present invention generally relates to computer systems, and more specifically, to computer-implemented methods, computer systems, and computer program products configured and arranged for dynamic creation of a temporary isolated environment in an interactive communication environment for potential bots.

Virtual reality is a simulated experience that can employ tracking and three-dimensional (3D) near-eye displays to offer the user an immersive feel of a virtual world. Applications of virtual reality may include entertainment particularly video games, education, business, etc. Other distinct types of virtual reality technology include augmented reality and mixed reality, sometimes referred to as extended reality. Virtual reality systems can use virtual reality headsets to generate realistic images, sounds, and other sensations that simulate a user's physical presence in the virtual reality. Virtual reality equipment enables a user to look around the artificial world, move around in it, and interact with virtual features or items. The simulated experience is commonly created by virtual reality headsets including, for example, a head-mounted display with a small screen in front of the eyes.

SUMMARY

Embodiments of the present invention are directed to computer-implemented methods for dynamic creation of a temporary isolated environment for potential bots in an interactive communication environment. A non-limiting computer-implemented method includes, in response to identifying that an avatar accessing the interactive communication environment is being controlled by a non-human entity, dynamically placing the avatar in an isolated virtual environment. The method includes disabling permissions of the avatar in the isolated virtual environment and causing an authentication inquiry to be presented to the avatar identified as being controlled by the non-human entity. Also, the method includes transferring a location of the avatar identified as being controlled by the non-human entity, based on a user response to the authentication inquiry.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
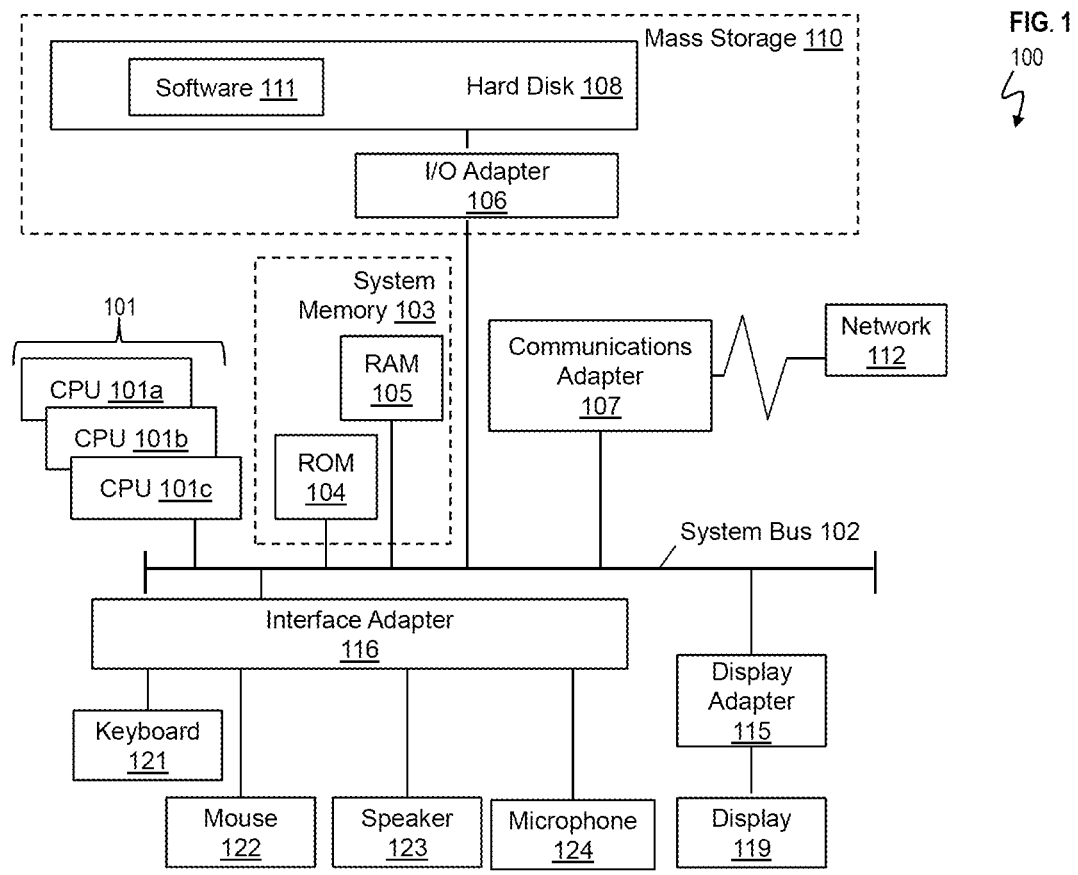
FIG. 1 depicts a block diagram of an example computer system for use in conjunction with one or more embodiments of the present invention.

One or more embodiments are configured and arranged to dynamically create a temporary isolated environment for potential bots in an interactive communication environment. According to one or more embodiments, when an avatar is determined to be controlled by a potential bot, a system dynamically places the avatar of the potential bot in the temporary isolated environment until an appropriate authentication inquiry or challenge is presented and passed by the user. After being transferred to the temporary isolated environment, the system removes all user permissions (e.g., sharing, texting, etc.) for the potential bot avatar, in accordance with one or more embodiments. The system determines the required authentication for the potential bot avatar, and the system gathers and presents the required authentication to the potential bot avatar. The system places the authenticated avatar back at the last known avatar location, after being authenticated. The system removes the potential bot avatar from the interactive communication environment, based on the potential bot avatar failing to pass the authentication.

Interactive communication environments can include any interactive communication system in which users can communicate and interact in real time with each other. Interactive communication environments can include various types of computing environments, which may be computer generated environments that require computer systems/equipment to access and interact. For example, one could not access and operate in an interactive communication environment with a simple pen/pencil and sheet of paper, as understood by one of ordinary skill in the art. Interactive communication environments can include virtual reality, gaming environments of a gaming systems, chat environments, etc. Interactive communication environments allow a communication, such as an audio communication (i.e., voice) and/or text communication, from a first user to be automatically output in real time, for example, on a display and/or on speakers to second user without requiring the user to take an action to receive the output.

Virtual reality is the latest milestone in the digital evolution of social media and web interactions. A well-known virtual environment for virtual reality has 28.7 billion active users. Now, as can be imagined, a virtual environment with such a large number of users will have a lot of risks. One of those risks are bots. A bot, short for robot, is a software program that performs automated, repetitive, and/or predefined tasks. Bots typically imitate or replace human user behavior. Because bots are automated, they operate much faster than human users. Although bots can conduct useful functions, bots can also come in the form of malware that is used to gain total control over a computer. Bots, which can be bad bots known as malware bots, carry risk and can be used for hacking, spamming, spying, interrupting, and compromising websites of all sizes. In the interactive communication environment, bots act as automated users aimed, for example, to post automated messages for publicity or perform some malicious action. Some of the issues with bots in the interactive communication environment include the following. 1) Bots cause a lot of computer resources of the host computer system to be utilized, such as processing power, bandwidth, memory, etc., which represents an additional demand on the interactive communication environment in terms of infrastructure requirements. 2) The user experience in the interactive communication environment can be negatively affected because the increased number of bots can cause performance issues on the platform (e.g., audio, video, etc.) of the interactive communication environment, such as delays or lag time. 3) The user experience can be negatively impacted by the larger number of bots constantly bothering users in the interactive communication environment with their problematic interactions. 4) The content displayed by bots (e.g., by messages, videos, and/or audio) can be offensive or inappropriate for a given set of users.

Technical solutions and benefits include a novel method and system that create a temporary and isolated environment to place potential bots until an appropriate authentication inquiry is presented and passed by the user. Accordingly, this prevents the potential bots from degrading the user experience, prevents the potential bots from causing a higher demand on computer resources such as processors, memory, bandwidth, etc., prevents the potential bots from slowing down the response time in the interactive communication environment, prevents the potential bots from displaying offensive and inappropriate content to other users, and/or prevents the potential bots from spreading malware to the users. One or more embodiments provide a system configured to identify a series of user accounts for avatars as potential bots, gather the required resources to create a temporary and isolated virtual environment as a virtual jail, remove those avatars from their current room or venue (e.g., a concert) in the interactive communication environment, and place the potential bot avatars in the newly created temporary virtual room. As further technical solutions and benefits, the temporary virtual room has a limited graphic interface to save system computer resources when quarantining the potential bot avatar. While in the temporary and isolated virtual environment, the system is configured to disable all user permissions for the potential bot avatar, which includes no object sharing, no video sharing, no screen sharing, no chat capabilities, no teleportation capabilities, etc. Further, the system is configured to determine the required authentication method based on various factors including: 1) user type; 2) a bot probability score (if available); 3) authentication policy from, for example, an authentication policy server; and/or 4) user metadata such as the Internet protocol address, the user account, the geolocation, the account settings, the account age, etc., for the potential bot avatar. Once the required authentication is determined, the system can create a connection with an application programming interface (API) to display the security challenge to the user, thereby determining the user is human based on receiving the correct response or determining the user is a bot based on receiving an incorrect response.

One or more embodiments described herein can utilize machine learning techniques to perform tasks, such as classifying a feature of interest. More specifically, one or more embodiments described herein can incorporate and utilize rule-based decision making and artificial intelligence (AI) reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example. In one or more embodiments, machine learning functionality can be implemented using an Artificial Neural Network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
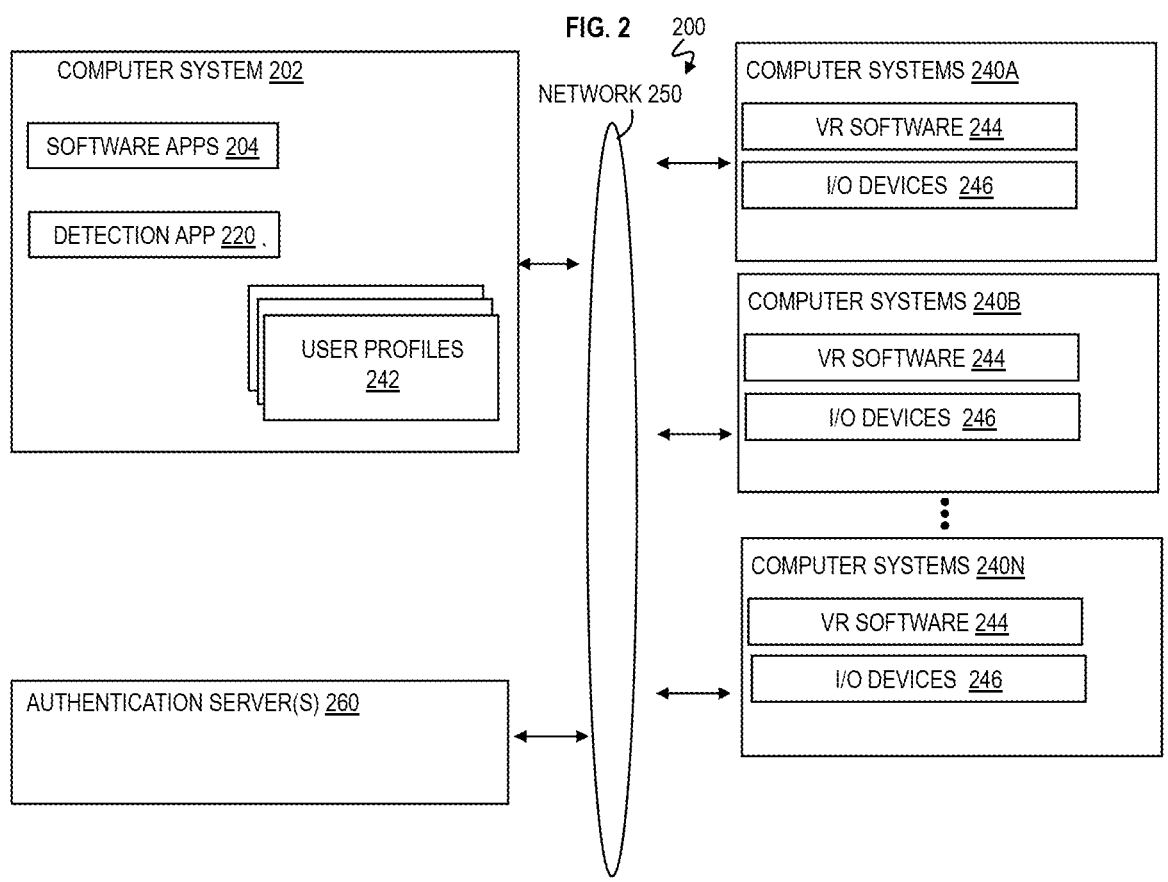
FIG. 2 depicts a block diagram of an example system configured to dynamically create a temporary isolated environment for potential bots in an interactive communication environment and place the potential bots in the temporary isolated environment according to one or more embodiments of the present invention.

FIG. 2 depicts a block diagram of an example system 200 configured to dynamically create a temporary isolated environment in an interactive communication environment for potential bots and perform security actions that place the potential bots in the temporary isolated environment according to one or more embodiments. The system 200 includes a computer system 202 configured to communicate over a network 250 with many different computer systems, such as a computer system 240A for providing the interactive communication environment to a user, a computer system 240B for providing the interactive communication environment to a user, through a computer system 240N for providing the interactive communication environment to a user. The computer systems 240A, 240B, through 240N can generally be referred to as computer systems 240 and are utilized to access the interactive communication environment including virtual reality, video gaming, etc., offered by the computer system 202. The network 250 can be a wired and/or wireless communication network.

For explanation purposes and not limitation, some example scenarios of the interactive communication environment may discuss virtual reality. It should be appreciated that one or more embodiments are not limited to examples utilizing virtual reality, and the discussions apply by analogy to any real time interactive communication environment. Some example scenarios may identify a user of computer system 240A as having one or more user accounts that utilize a bot for controlling an avatar in the interactive communication environment hosted by and/or generated by one or more computer systems 202.

In one or more embodiments, the computer systems 240 can be representative of any type of virtual reality equipment, gaming equipment, and/or electronic device for experiencing a virtual environment, including a virtual reality headset. The computer systems 240 can include various software and hardware components including virtual reality software 244 for general virtual reality operations known by one of ordinary skill in the art. Although virtual reality is utilized as an example, the virtual reality software 244 can be representative of gaming software of well-known gaming systems. The computer systems 240 can include one or more input/output (I/O) devices 246 including cameras, a microphone, a display, and other peripherals. The computer systems 240 can be coupled to a controller, such as a handheld controller. The computer system 202, computer systems 240, authentication policy server 260, virtual reality software 244, software applications 204, bot detection application 220, etc., can include functionality and features of the computer system 100 in FIG. 1 including various hardware components and various software applications such as software 111 which can be executed as instructions on one or more processors 101 in order to perform actions according to one or more embodiments of the invention. The software applications 204 can include, be integrated with, and/or call various other pieces of software, algorithms, application programming interfaces (APIs), etc., to operate as discussed herein. The software applications 204 may be representative of numerous software applications designed to work together. Each of the users of the computer systems 240A-240N have registered with registration and authentication software for a user account in order to utilize the virtual reality services provided by computer system 202, and each of the users has its own user account in its own user profile in user profiles 242. The user profile may record when the user account signs on and signs off the virtual reality, actions taken in virtual reality, contact information including email addresses, usernames, etc., and/or locations visited in the interactive communication environment, etc. The user profile may record when a user account is created, who are the friends/followers, the number of friends/followers, etc. The user profile of a user may include the Internet protocol (IP) address of the user, the location of the user, the connected time of the user, etc. The software applications 204 can access and/or include the registration and authentication software in order to control access to the interactive communication environment. The software applications 204 can perform actions and/or cause any actions to be performed on any of the user accounts in the user profiles 242 when the computer system 202 determines that a potential bot is controlling the actions of an avatar for a user account as discussed herein.

The computer system 202 may be representative of numerous computer systems and/or distributed computer systems configured to provide virtual reality services to users of the computer systems 240. The computer system 202 can be part of a cloud computing environment such as a cloud computing environment 50 depicted in FIG. 10, as discussed further herein.

Figure 3:
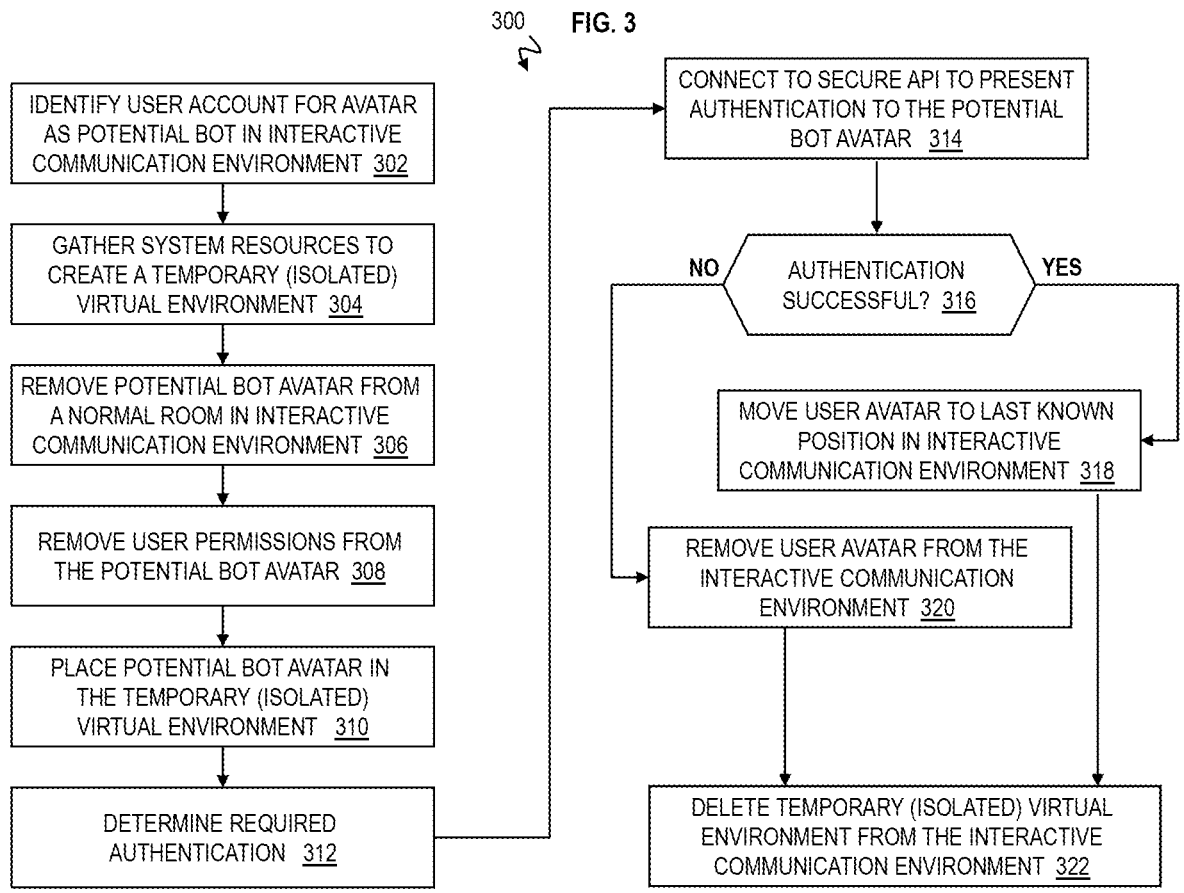
FIG. 3 is a flowchart of a computer-implemented method for dynamically creating a temporary isolated environment in an interactive communication environment for potential bots and placing the potential bots in the temporary isolated environment according to one or more embodiments of the present invention.

FIG. 3 is a flowchart of a computer-implemented method 300 for dynamically creating a temporary isolated environment in an interactive communication environment for potential bots and performing security actions that place the potential bots in the temporary isolated environment according to one or more embodiments. The computer-implemented method 300 is executed by the computer system 202. Reference can be made to any figures discussed herein.

At block 302 of the computer-implemented method 300, one or more software applications 204 of computer system 202 are configured to identify one or more user accounts for avatars as potential bots in the interactive communication environment. The software applications 204 can include, employ, and/or call any known bot detection application 220 for use in the interactive communication environment. In one or more embodiments, the software applications 204 may utilize third party software and/or hardware for bot detection, as understood by one of ordinary skill in the art. Bot detection is the process of identifying traffic from automated programs (i.e., bots) in the interactive communication environment. The bots can access the interactive communication environment using the virtual reality software 244, which can be via a host website, a mobile app, an application programming interface, etc.

In one or more embodiments, the bot detection application 220 may include rules-based algorithms for determining whether an avatar is controlled by a non-human entity or a human. In one or more embodiments, the bot detection application 220 may include one or more machine learning models having machine learning algorithms. The machine learning algorithms are trained on training data of numerous activities performed by bots in the interactive communication environment, where the activities of the bots are labeled. Feature vectors of the various activities for each bot are created and labeled for training data. During the training phase, the machine learning algorithms are trained to detect bots in the interactive communication environment (e.g., the virtual world) based on their activities, resulting in a trained machine learning model. The trained machine learning model can classify avatars as being controlled by a non-human entity (e.g., a bot) or human, and may also provide a confidence score for the classification.

Figure 4:
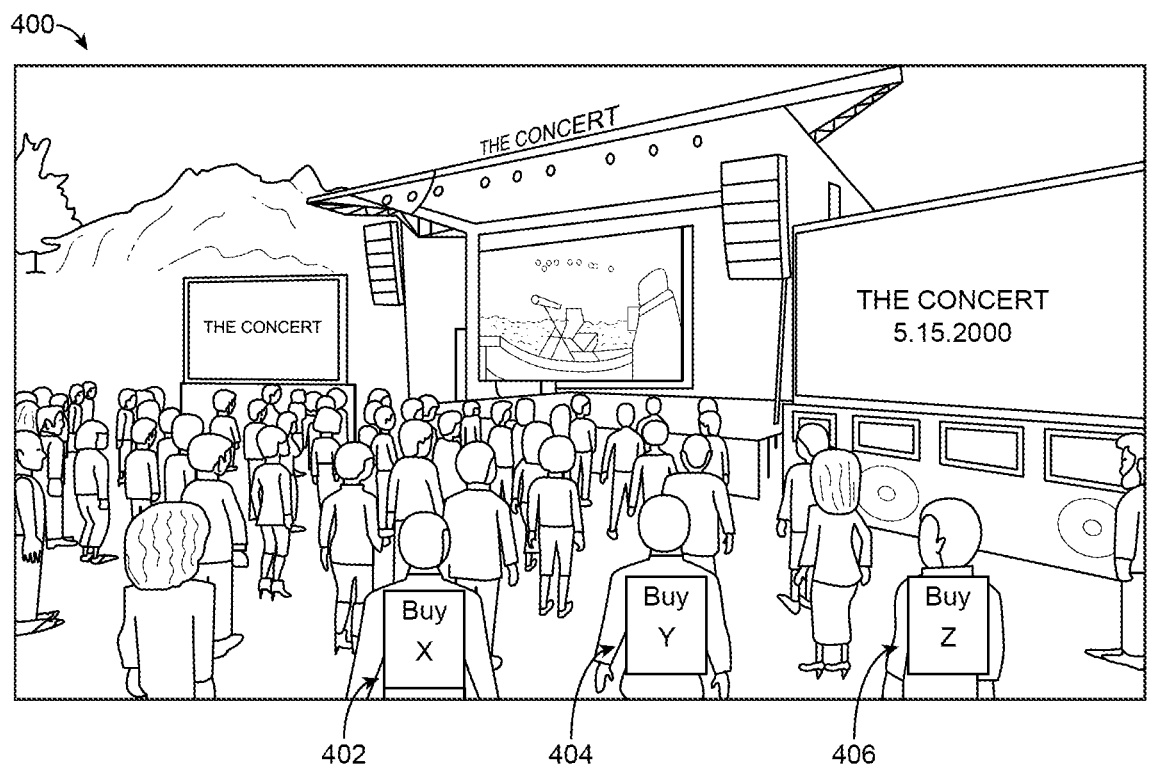
FIG. 4 depicts an example interactive communication environment for user avatars according to one or more embodiments of the present invention.

FIG. 4 depicts an example interactive communication environment 400 (e.g., a virtual environment in virtual reality) for user avatars according to one or more embodiments. Example user avatars are illustrated in a virtual world in the interactive communication environment 400 of FIG. 4. The user avatars of users can freely maneuver and interact with objects in the virtual environment. At this point, the user avatars have all the normal permissions to operate in the interactive communication environment 400. Each user avatar is associated with a user account in the user profiles 242. In the example scenario, the user avatars 402, 404, and 406 have been identified as potential bots, which means that the control of the avatars 402, 404, and 406 is potentially by bots. The user avatars may be at a venue such as a concert in a virtual room. In one or more embodiments, the avatars 402, 404, and 406 could be associated with the display of inappropriate content, such as "Buy X", "Buy Y", and "Buy Z". The avatars 402, 404, and 406 may be deemed potential bot avatars because they were identified by the bot detection application 220 as potentially being controlled by bots and not human users. A human user can utilize software to control the actions of a user avatar in the interactive communication environment such that the user avatar responds to user input in real time or near real time. Unlike a human user, a bot is a computer program that operates as an agent for a user or other program in order to simulate human activity, and bots can run without specific instructions from humans.

Figure 5:
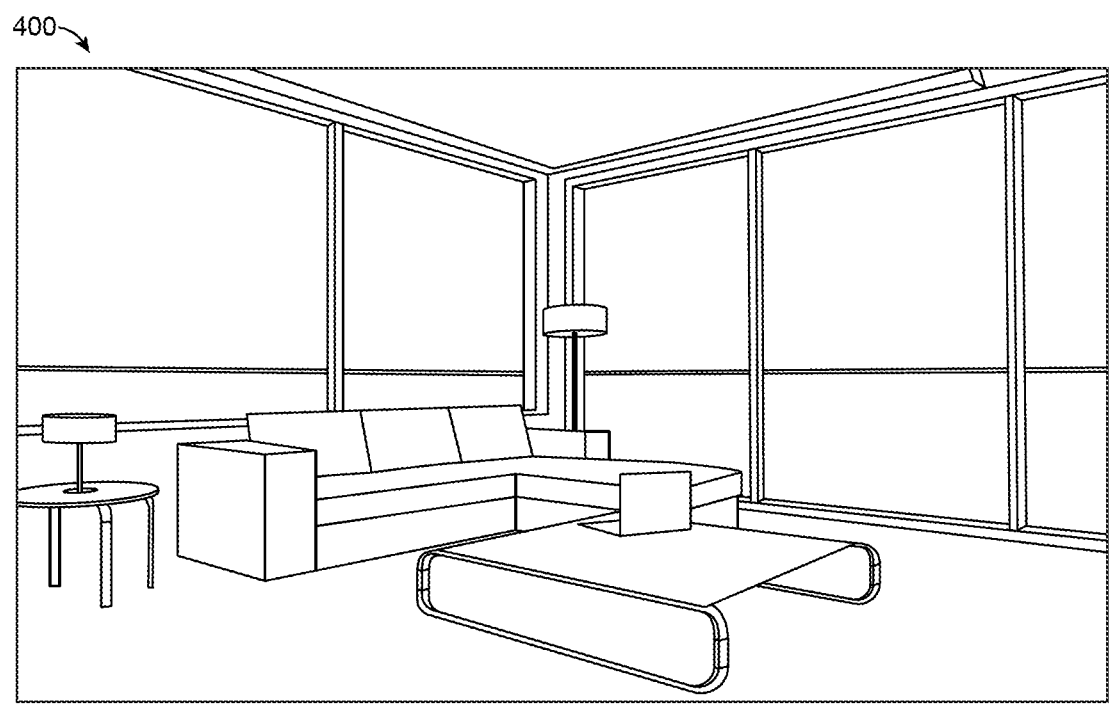
FIG. 5 depicts an example interactive communication environment in which a temporary isolated virtual environment is illustrated according to one or more embodiments of the present invention.

Referring to FIG. 3, at block 304, one or more software applications 204 are configured to appropriate computer system resources to create a temporary isolated virtual environment in response to detecting the potential bot avatars. The software applications 204 can select available memory, processing power, bandwidth, etc., to generate the temporary isolated virtual environment. FIG. 5 depicts an example interactive communication environment 400 in which a temporary isolated virtual environment is illustrated according to one or more embodiments. In FIG. 5, the temporary isolated virtual environment is created by using limited computer resources of the computer system 202 by reducing the graphics from a normal virtual room in interactive communication environment 400. In one or more embodiments, the temporary isolated virtual environment may be an empty room with four walls. The temporary isolated virtual environment can have no color, very little color, and/or less graphic detail compared to a normal virtual room generated for the interactive communication environment 400. The normal virtual room uses more computational resources such as memory, processors, bandwidth, etc., of the computer system 202 than the temporary isolated virtual environment.

Figure 6:
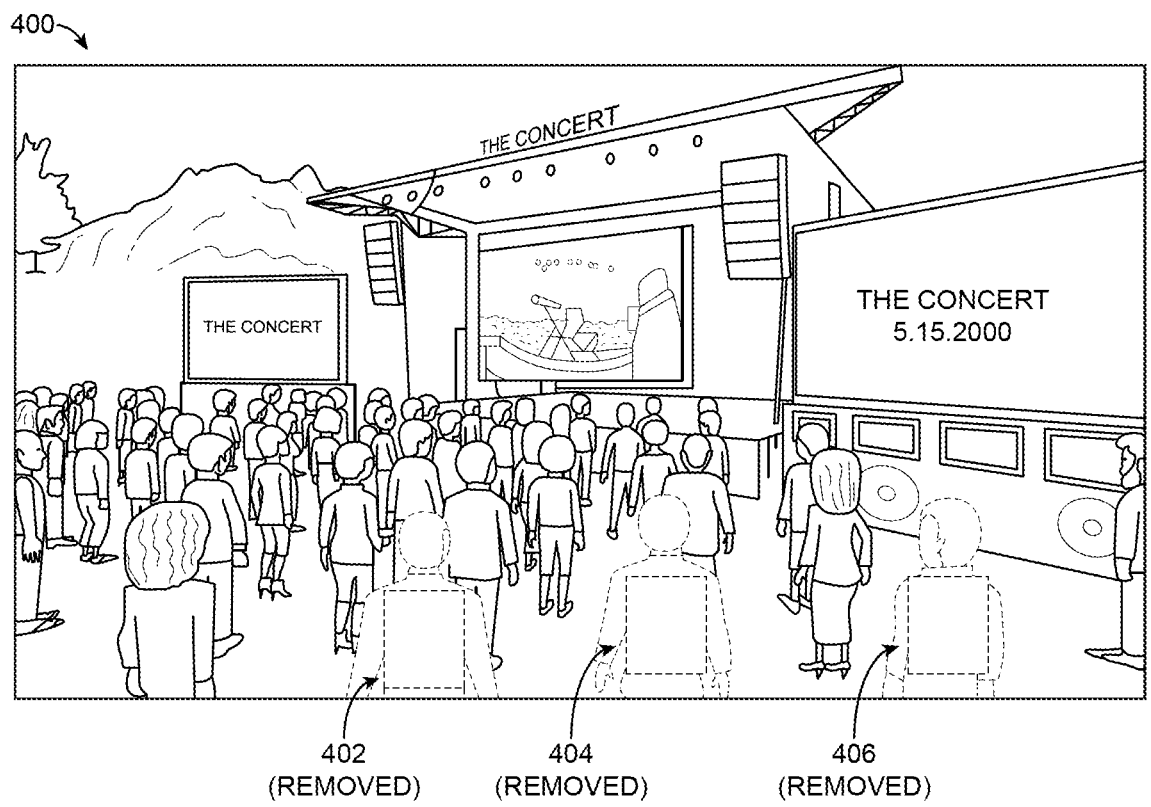
FIG. 6 depicts an example interactive communication environment in which potential bot avatars have been removed from a normal room according to one or more embodiments of the present invention.

Referring to FIG. 3, at block 306, one or more software applications 204 are configured to remove the potential bot avatars from a normal virtual room in the interactive communication environment 400 in the temporary isolated virtual environment. In the example scenario, the potential bot avatars 402, 404, and 406 were in a normal virtual room or venue, for example, the concert in FIG. 4. FIG. 6 depicts the example interactive communication environment 400 in which the potential bot avatars 402, 404, and 406 have been removed from the normal virtual room. In FIG. 6, the potential bot avatars 402, 404, and 406 have been removed from the concert in this example, but it should be appreciated that potential bot avatars can be removed from any normal virtual room that is accessible by other user avatars. The temporary isolated virtual environment has restricted access and is not open to the public in the interactive communication environment 400. In FIG. 6, dashed lines are utilized to denote the removal of the potential bot avatars 402, 404, and 406 from the normal virtual room in the interactive communication environment 400. The potential bot avatars 402, 404, and 406 are no longer displayed to the other user avatars, for example, the other user avatars controlled by human users. Any actions being performed and/or previously performed by the potential bot avatars 402, 404, and 406 are discontinued, and the results are removed from the interactive communication environment 400.

Figure 7:
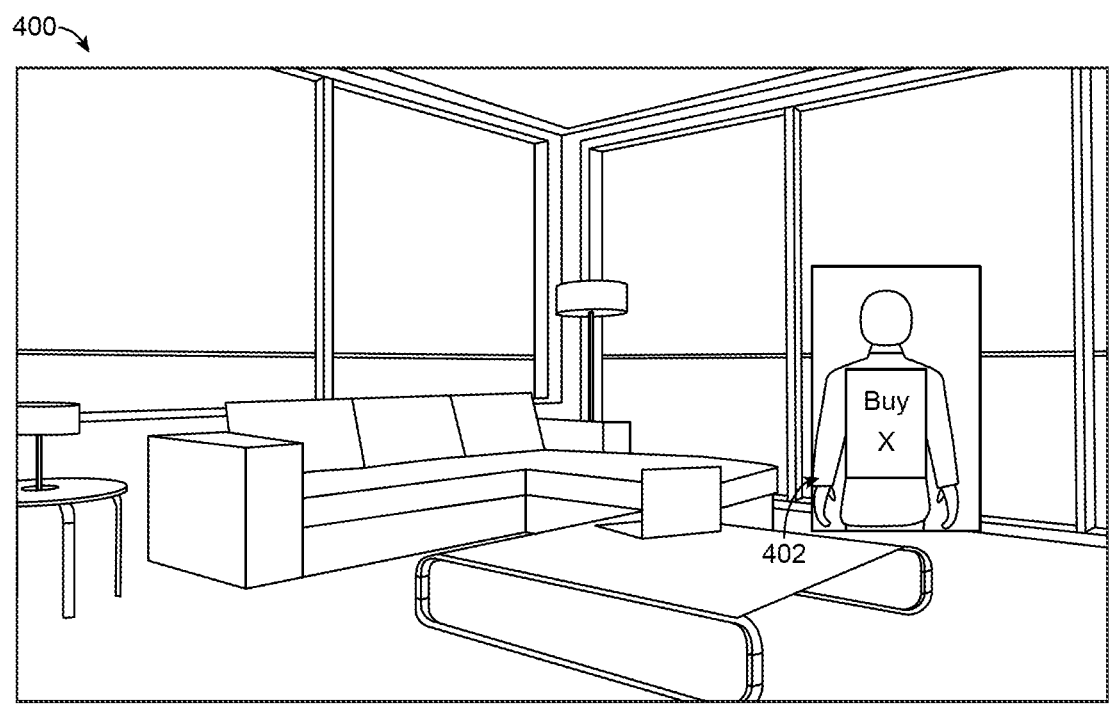
FIG. 7 depicts a temporary isolated virtual environment in which a potential bot avatar has been placed according to one or more embodiments of the present invention.

At blocks 308 and 310, one or more software applications 204 are configured to remove user permissions from the potential bot avatars 402, 404, and 406 and place the potential bot avatars 402, 404, and 406 in the temporary isolated virtual environment. The potential bot avatars 402, 404, and 406 are unable to leave the temporary isolated virtual environment. Each user avatar in the interactive communication environment is associated with its own user account in the user profiles 242. The software applications 204 are configured to search and find the user accounts for each of the potential bot avatars 402, 404, and 406. While in the temporary isolated virtual environment, the software applications 204 disable user permissions for each of the user accounts associated with the potential bot avatars 402, 404, and 406. Disabling user permissions includes blocking object sharing, blocking video sharing, blocking screen sharing, blocking chat capabilities, and blocking teleportation capabilities. The software applications 204 may display a message "Please excuse the inconvenience. After successful authentication, you will be returned back." FIG. 7 depicts the temporary isolated virtual environment in the interactive communication environment 400 where an example potential bot avatar has been placed according to one or more embodiments. In FIG. 7, a single potential bot avatar 402 is shown for illustration purposes. It is noted that numerous potential bot avatars can be placed in the same temporary isolated virtual environment awaiting authentication.

Figure 8:
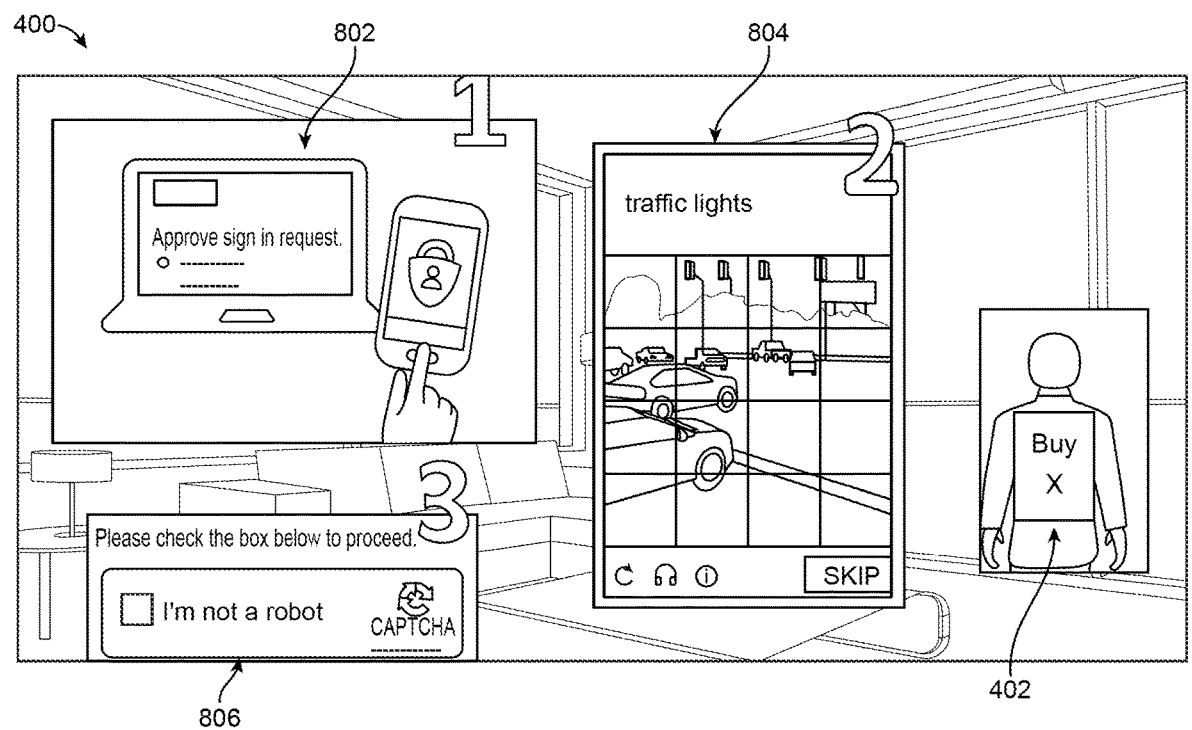
FIG. 8 depicts example authentication inquiries to determine whether a user is a human according to one or more embodiments of the present invention.

Referring to FIG. 3, at block 312, one or more software applications 204 are configured to determine an authentication method for authenticating the potential bot avatars. FIG. 8 depicts example authentication inquiries that can be made to determine whether the user of the user account for the potential bot avatar is a human or non-human entity (e.g., bot). For authentication of the user account associated with the potential bot avatar, the software applications 204 can invoke an authentication method 802 that uses multifactor authentication such as, for example, Google® authenticator, Microsoft® authenticator, etc., on separate devices of the user. The software applications 204 can invoke an authentication method 804 that uses a picture as a challenge that requires human input and discernment to make selections about the picture. The software applications 204 can invoke an authentication method 806 that requires an acknowledgement as a challenge such as, for example, a CAPTCHA (completely automated public Turing test to tell computers and humans apart).

In one or more embodiments, the authentication method for authenticating the potential bot avatars could be determined based on factors. Example factors can include 1) a user type; 2) a bot probability score (if available); 3) an authentication policy from, for example, the authentication policy server 260; and/or 4) user metadata such as the Internet protocol address, user account, geolocation, account settings, account age, etc., associated with the user Based on user type, the user type could be a guest user that logged in through a social media site, a registered user, and/or a premium user that paid for upgraded virtual services. The software applications 204 can send the authentication inquiry (i.e., challenge) for authentication through the social media site for a guest user type such that the owner of the user account can prove he/she is not a bot. For the registered user, the software applications 204 can require multifactor authentication on two separate devices of the user, for example, a laptop and a mobile device (e.g., a smartphone). For the premium user, the software applications 204 may require a username and password.

For the bot probability score, the software applications 204 can receive a confidence score indicating the likelihood the potential bot avatar is actually a bot. The software applications 204 can receive the confidence score from a bot detection application 220. If the confidence score is above a threshold, the software applications 204 are configured to require a more complex authentication method such as multifactor authentication. If the confidence score is below the threshold, the software applications 204 may require a less complex authentication method such as a password.

For user metadata, the software applications 204 can parse and select any user metadata from the user account in the user profiles 242 in order to generate an authentication inquiry for the user. Additionally, the software applications 204 can use metadata to determine if two or more potential bot avatars have the same Internet protocol address, the same user account, the same geolocation, the same account settings, and/or the same account age, which means that a more complex authentication method is to be utilized. Having the same and/or nearly the same metadata for many potential bot avatars indicate that the computer system 240 is likely using bots to control the avatars being authenticated.

Continuing with FIG. 3, at block 314, one or more software applications 204 are configured to optionally connect with a secure API or secure authentication policy server 260 to present the authentication inquiry to the potential avatar bot for the user account. In one or more embodiments, the software applications 204 can present the authentication inquiry to the potential avatar bot. Although multiple potential bot avatars can be in the same temporary isolated virtual environment, the authentication inquiry is kept confidential and only viewable by the intended user of the potential bot avatar.

At block 316, the software applications 204 are configured to determine if a user response to the authentication inquiry is successful, and/or the authentication policy server 260 can inform the software applications 204 if the user response to the authentication inquiry is successful.

At block 318, if ("Yes") the user response is successful to the authentication inquiry for the user account of the potential bot avatar, the software applications 204 are configured to return the user avatar to the last known position or virtual room in the interactive communication environment. The software applications 204 also restore all user permissions to the user account. If the last known position or virtual room is unavailable, the user avatar is moved to the original spawn point, where the user initially entered the interactive communication environment.

At block 320, if ("No") the user response is not successful to the authentication inquiry for the user account of the potential bot avatar, the software applications 204 are configured to remove the potential bot avatar from the interactive communication environment. The software applications 204 can delete the associated user account or quarantine the user account. The software applications 204 can also flag any metadata associated with the user account in the user profiles 242 in order to prevent, block, and/or monitor subsequent attempts to use bots in the interactive communication environment by the computer system 240.

At block 322, the software applications 204 are configured to delete the temporary isolated virtual environment in the interactive communication environment. Deleting the temporary isolated virtual environment until the next potential bot avatar is identified saves computer resources of the computer system 202.

Figure 9:
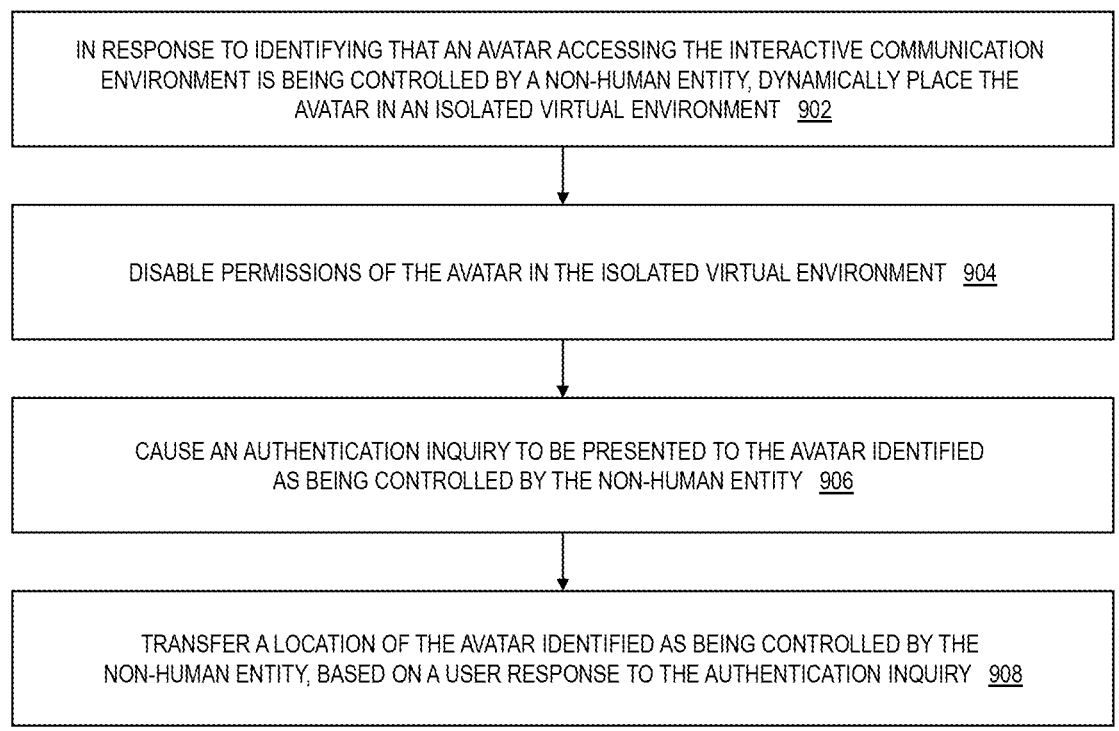
FIG. 9 is a flowchart of a computer-implemented method for dynamically creating a temporary isolated environment in an interactive communication environment and performing security actions that place potential bots in the temporary isolated environment according to one or more embodiments of the present invention.

FIG. 9 is a flowchart of a computer-implemented method 900 for dynamically creating a temporary isolated environment in an interactive communication environment for potential bots and performing security actions that place the potential bots in the temporary isolated environment according to one or more embodiments. The computer-implemented method 900 is executed by the computer system 202. Reference can be made to any figures discussed herein.

At block 902, the software applications 204 are configured to, in response to identifying that an avatar accessing the interactive communication environment is being controlled by a non-human entity, dynamically place the avatar in an isolated virtual environment. For example, the potential bot avatar 402 has been identified in FIG. 4 and placed in the temporary isolated virtual environment in FIG. 7.

At block 904, the software applications 204 are configured to disable permissions of the avatar in the isolated virtual environment. The user account associated with the potential bot avatar 402 has its user permissions disabled in its user profile 242.

At block 906, the software applications 204 are configured to cause an authentication inquiry to be presented to the avatar identified as being controlled by the non-human entity. The software applications 204 may use any authentication method to challenge the user of the user account for the potential bot avatar 402. The authentication method is utilized to determine if the user of the user account for the potential bot avatar 402 is a non-human entity or human. The non-human entity is a bot or automated program pretending to behave like a human in the interactive communication environment.

At block 908, the software applications 204 are configured to transfer a location of the avatar identified as being controlled by the non-human entity, based on a user response to the authentication inquiry. The user response from the user could be successful, which confirms that the avatar is being controlled by a human. The user response from the user may fail, which indicates that the potential bot avatar 402 is being controlled by a non-human entity.

In one or more embodiments, transferring the location of the avatar identified as being controlled by the non-human entity comprises transferring the avatar to a last known location of the avatar, in response to the user response successfully passing the authentication inquiry. The last known location is the location or virtual room the avatar was in before being transferred to the temporary isolated environment. For example, the avatar could be transferred back to the concert in FIG. 4. The user may successfully pass any of the example authentication inquiries for the authentication method 802, 804, or 806. Further, transferring the location of the avatar identified as being controlled by the non-human entity comprises transferring the avatar to an origination point at which the avatar initially entered the interactive communication environment, in response to the user response successfully passing the authentication inquiry.

Transferring the location of the avatar identified as being controlled by the non-human entity comprises removing the avatar from the interactive communication environment, in response to the user response failing the authentication inquiry. In this case, the software applications 204 have determined that the potential bot avatar 402 is actually being controlled by a non-human entity, for example, a bot.

The isolated virtual environment is created in response to identifying that the avatar accessing the interactive communication environment is being controlled by the non-human entity. For example, an isolated virtual environment is depicted in FIG. 5. The isolated virtual environment is deleted in response to transferring the location of the avatar out of the isolated virtual environment. Disabling the permissions of the avatar in the isolated virtual environment comprises disabling object sharing, disabling video sharing, disabling screen sharing, disabling chat capabilities, and disabling teleportation capabilities. As such, the user permissions for the potential bot avatar 402 are disabled until the user proves that he/she is a human by successfully passing the authentication inquiry. The user permissions are restored after passing the authentication inquiry.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
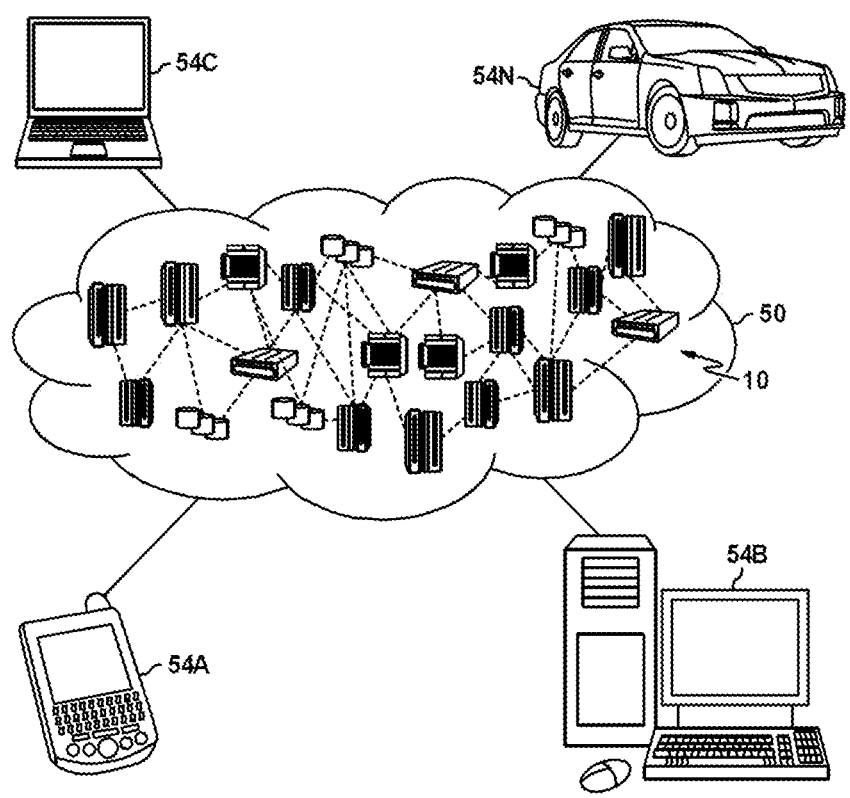
FIG. 10 depicts a cloud computing environment according to one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
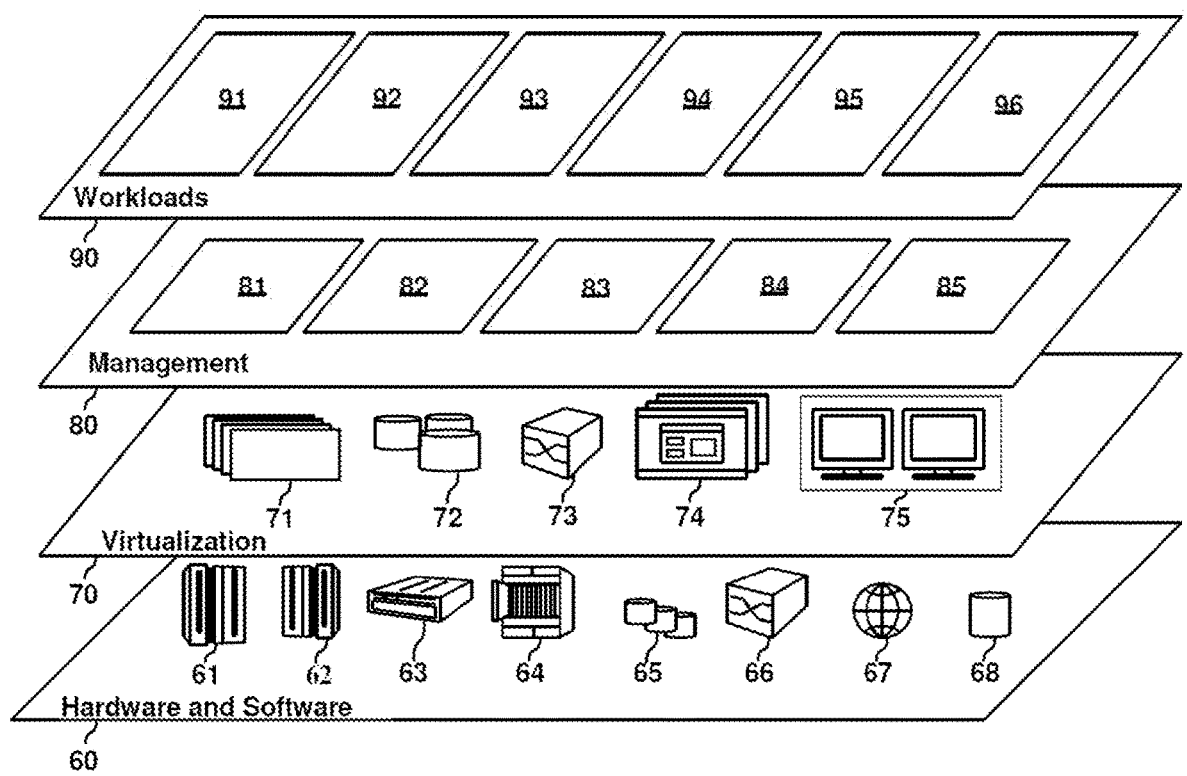
FIG. 11 depicts abstraction model layers according to one or more embodiments of the present invention.

Referring now to FIG. 11, a set of functional abstraction layers provided by cloud computing environment 50 (depicted in FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
in response to identifying that an avatar accessing an interactive communication environment is being controlled by a non-human entity, dynamically placing the avatar in an isolated virtual environment;
disabling permissions of the avatar in the isolated virtual environment;
causing an authentication inquiry to be presented to the avatar identified as being controlled by the non-human entity; and
transferring a location of the avatar identified as being controlled by the non-human entity, based on a user response to the authentication inquiry.

2. The computer-implemented method of claim 1, wherein transferring the location of the avatar identified as being controlled by the non-human entity comprises transferring the avatar to a last known location of the avatar, in response to the user response passing the authentication inquiry.

3. The computer-implemented method of claim 1, wherein transferring the location of the avatar identified as being controlled by the non-human entity comprises transferring the avatar to an origination point at which the avatar initially entered the interactive communication environment, in response to the user response passing the authentication inquiry.

4. The computer-implemented method of claim 1, wherein transferring the location of the avatar identified as being controlled by the non-human entity comprises removing the avatar from the interactive communication environment, in response to the user response failing the authentication inquiry.

5. The computer-implemented method of claim 1, wherein the isolated virtual environment is created in response to identifying that the avatar accessing the interactive communication environment is being controlled by the non-human entity.

6. The computer-implemented method of claim 1, wherein the isolated virtual environment is deleted in response to transferring the location of the avatar out of the isolated virtual environment.

7. The computer-implemented method of claim 1, wherein disabling the permissions of the avatar in the isolated virtual environment comprises disabling object sharing, disabling video sharing, disabling screen sharing, disabling chat capabilities, and disabling teleportation capabilities.

8. A system comprising:
a memory having computer readable instructions; and
one or more processors for executing the computer readable instructions, the computer readable instructions controlling the one or more processors to perform operations comprising:
in response to identifying that an avatar accessing an interactive communication environment is being controlled by a non-human entity, dynamically placing the avatar in an isolated virtual environment;
disabling permissions of the avatar in the isolated virtual environment;
causing an authentication inquiry to be presented to the avatar identified as being controlled by the non-human entity; and
transferring a location of the avatar identified as being controlled by the non-human entity, based on a user response to the authentication inquiry.

9. The system of claim 8, wherein transferring the location of the avatar identified as being controlled by the non-human entity comprises transferring the avatar to a last known location of the avatar, in response to the user response passing the authentication inquiry.

10. The system of claim 8, wherein transferring the location of the avatar identified as being controlled by the non-human entity comprises transferring the avatar to an origination point at which the avatar initially entered the interactive communication environment, in response to the user response passing the authentication inquiry.

11. The system of claim 8, wherein transferring the location of the avatar identified as being controlled by the non-human entity comprises removing the avatar from the interactive communication environment, in response to the user response failing the authentication inquiry.

12. The system of claim 8, wherein the isolated virtual environment is created in response to identifying that the avatar accessing the interactive communication environment is being controlled by the non-human entity.

13. The system of claim 8, wherein the isolated virtual environment is deleted in response to transferring the location of the avatar out of the isolated virtual environment.

14. The system of claim 8, wherein disabling the permissions of the avatar in the isolated virtual environment comprises disabling object sharing, disabling video sharing, disabling screen sharing, disabling chat capabilities, and disabling teleportation capabilities.

15. A computer program product comprising a computer readable storage medium having program instructions embodied therewith, the program instructions executable by one or more processors to cause the one or more processors to perform operations comprising:
in response to identifying that an avatar accessing an interactive communication environment is being controlled by a non-human entity, dynamically placing the avatar in an isolated virtual environment;
disabling permissions of the avatar in the isolated virtual environment;
causing an authentication inquiry to be presented to the avatar identified as being controlled by the non-human entity; and
transferring a location of the avatar identified as being controlled by the non-human entity, based on a user response to the authentication inquiry.

16. The computer program product of claim 15, wherein transferring the location of the avatar identified as being controlled by the non-human entity comprises transferring the avatar to a last known location of the avatar, in response to the user response passing the authentication inquiry.

17. The computer program product of claim 15, wherein transferring the location of the avatar identified as being controlled by the non-human entity comprises transferring the avatar to an origination point at which the avatar initially entered the interactive communication environment, in response to the user response passing the authentication inquiry.

18. The computer program product of claim 15, wherein transferring the location of the avatar identified as being controlled by the non-human entity comprises removing the avatar from the interactive communication environment, in response to the user response failing the authentication inquiry.

19. The computer program product of claim 15, wherein the isolated virtual environment is created in response to identifying that the avatar accessing the interactive communication environment is being controlled by the non-human entity.

20. The computer program product of claim 15, wherein the isolated virtual environment is deleted in response to transferring the location of the avatar out of the isolated virtual environment.

\* \* \* \* \*